United States Patent
Engers et al.

(10) Patent No.: US 11,301,492 B1
(45) Date of Patent: Apr. 12, 2022

(54) NETWORK ADDRESS RANGE STORAGE AND RETRIEVAL

(71) Applicant: Amazon Technologies, Inc., Reno, NV (US)

(72) Inventors: Ross Bevan Engers, Cape Town (ZA); Stefan Letz, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 1079 days.

(21) Appl. No.: 14/221,173

(22) Filed: Mar. 20, 2014

(51) Int. Cl.
*G06F 16/28* (2019.01)
*G06F 16/245* (2019.01)

(52) U.S. Cl.
CPC .......... *G06F 16/284* (2019.01); *G06F 16/245* (2019.01)

(58) Field of Classification Search
CPC ....... G06F 17/30; G06F 16/245; G06F 16/284
See application file for complete search history.

(56) References Cited

U.S. PATENT DOCUMENTS

| | | | | |
|---|---|---|---|---|
| 6,442,588 B1* | 8/2002 | Clark | ...................... | H04L 29/06 709/203 |
| 6,693,878 B1* | 2/2004 | Daruwalla | .......... | H04L 12/2801 370/235 |
| 6,938,031 B1* | 8/2005 | Zoltan | ............... | G06F 17/30864 707/771 |
| 7,373,660 B1* | 5/2008 | Guichard | ................ | H04L 47/10 726/15 |
| 7,779,461 B1* | 8/2010 | Liu | ...................... | H04L 12/4633 713/153 |
| 7,953,070 B1* | 5/2011 | Agarwal | ............. | H04M 7/0078 370/352 |
| 7,970,765 B1* | 6/2011 | Olsen | ................... | H04L 12/4679 707/737 |
| 8,549,081 B2* | 10/2013 | Leiba | ................... | G06Q 10/107 709/206 |
| 2006/0123134 A1* | 6/2006 | Munger | ............ | H04L 29/12216 709/245 |
| 2007/0067361 A1* | 3/2007 | Bailey | ............... | G06F 17/30581 |
| 2010/0106742 A1* | 4/2010 | Guruswamy | ........... | H04L 41/12 707/773 |

OTHER PUBLICATIONS

Geeksengine, NPL "How to load IP addresses for countries into your MySQL database", Aug. 28, 2010, GeeksEngine.com.*

* cited by examiner

*Primary Examiner* — Irete F Ehichioya
*Assistant Examiner* — Huen Wong
(74) *Attorney, Agent, or Firm* — Davis Wright Tremaine LLP (57) ABSTRACT

A database management system may be configured to receive requests related to storing and retrieving network address information. Requests may be represented in a query language as a native data type. Network address information may be stored using a data format indicative of ranges of network addresses, including bit fields indexed by a hash function and range trees. Network addresses may be located based on traversing rows in a table and traversing network address ranges stored in rows. A network address may be validated by locating the stored address and examining properties associated with the address.

16 Claims, 9 Drawing Sheets

NETWORK ADDRESS RANGE STORAGE AND RETRIEVAL

BACKGROUND

A provider may host a virtual network on behalf of various customers. A virtual network may comprise elements, such as virtual network addresses, subnets, routers, gateways and so forth, by which various computing resources are interconnected. The provider may allow for addresses used in a virtual network to be customized. The virtual networks hosted by a provider may therefore be associated with a number of different sets of network addresses, records of which may be kept by the provider. In addition, a virtual network provider may supply various mechanisms for interconnecting between external networks and a virtual network. This may also involve maintaining records for a significant number of network addresses.

Records of network addresses may be stored by a database management system using character-based encodings. Storing address information as strings may result in increased complexity and reduced efficiency due to difficulties associated with manipulating character-based encodings. Accordingly, storing network address information using character-based encodings may be impractical when used in connection with the provision of virtual networks.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Implementations of virtual network infrastructure may involve management of large numbers of internet protocol ("IP") addresses and other types of information describing various aspects of virtual networks, such as network topology, network addresses, address translations, interconnections between networks and so forth. Management of network addresses may involve various forms of validation operations and lookups involving ranges of network addresses or classes of network addresses. A network address may refer to internet protocol ("IP") addresses, media access control ("MAC") addresses or other forms of identifying senders or recipients on a network.

Figure 1A:
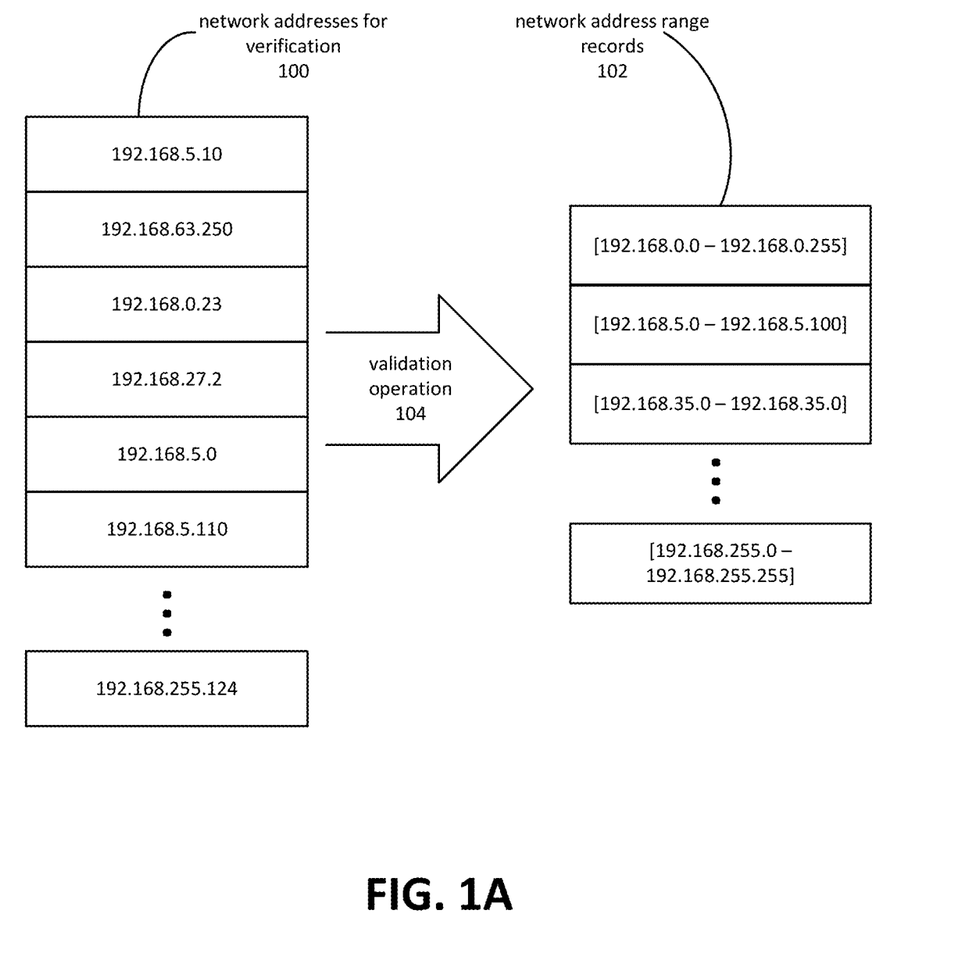
FIG. 1A is a block diagram depicting validation of a first set of network addresses against a second set of network addresses.

FIG. 1A depicts an example of a network address management operation performed using aspects of the present disclosure. Input to a validation operation 104 may comprise a list of network addresses for verification 100. The validation operation 104 may comprise comparing the input against a plurality of network address ranges records 102. These may be representative of valid network addresses—for example those addresses that have been configured within a virtual network. There may be a large number of network addresses to be validated, and there may be a large number of potentially valid addresses. As a result, performing validation operation 104 could involve consuming significant amounts of time and computing resources. However, aspects of the present embodiment may be employed to perform range-based searching that may be relatively efficient.

Figure 1B:
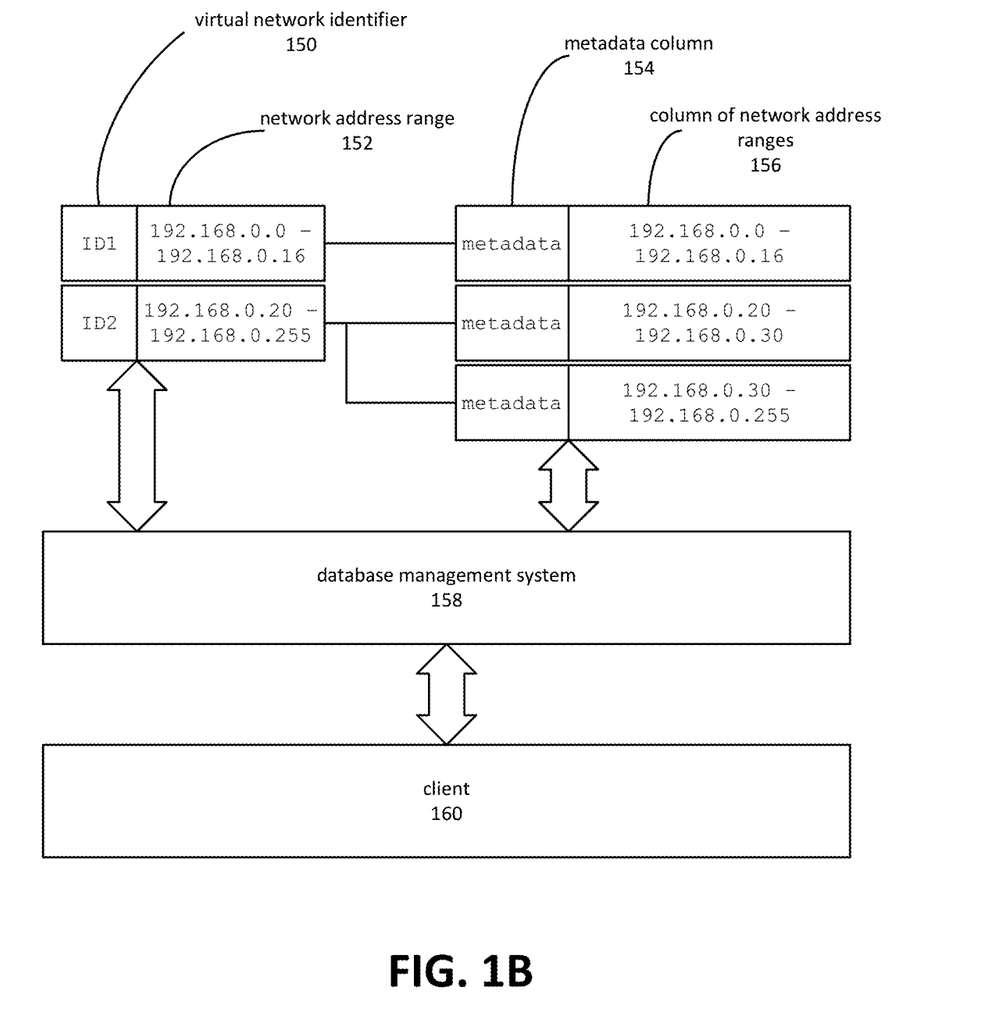
FIG. 1B is a block diagram depicting an example of a system for storing and retrieving network address information using a network address range data type.

FIG. 1B depicts an embodiment of a system for the storage and retrieval of network address information. A client 160 may interface with a database management system 158. Client 160 may request that network address information be stored by the database management system 158. The information may comprise lists of network addresses, such as IP version 4 addresses or IP version 6 addresses. The network address information may be accompanied by other data, such as mask data, virtual private cloud identifiers and so forth. Network address information may be expressed as a list of addresses or as a compact representation to express a range of addresses. Network address information may be represented in textual format and may be expressed in a query language statement to be processed by a database management system.

Storage of information by database management system 158 may comprise storing network address information in a table. A table may be structured in row and column format, a hierarchical format, name-value pairs or other formats. As used herein, the term table encompasses these and other structures. The term row encompasses collections of associated values within a table. The term column encompasses a value within a row and may also refer to values in different rows having the same semantic meaning.

Each row of a table may comprise data indicative of a range of network addresses. The data may be stored in a network address range column 156. Each row in a table containing a network address range column 156 may contain an instance of a network address range data type. Each instance of the data type may represent one or more ranges of network addresses. In various cases and embodiments, the range of network addresses stored in a network address column 156 value may be a contiguous range of addresses. In other embodiments, disjoint ranges of network addresses may be stored as a column value.

Some embodiments may permit overlapping ranges of address to be stored in a table of addresses. In other embodiments, addresses may be stored without allowing overlapping ranges. For example, when an address is inserted, an embodiment might compare existing ranges stored in the table with the address, and if the address falls within an existing range, add the address to that range. In some embodiments, ranges may be stored in a defined but empty state so that addresses may be added to a defined range and, in some cases and embodiments, not added if no corresponding range is defined.

In some embodiments, address ranges stored in a table may be merged or otherwise consolidated. For example, a plurality of disjoint or overlapping ranges may be combined to form a single representation of the range, and stored as a single row in the table. Merge operations such as this, in some cases, may be based in part on stored topology information. For example, stored topology information may comprise indications of the addresses associated with various subnets or/and virtual networks. A merge operation may involve consolidating address ranges stored in a table into a smaller set of addresses, so that the addresses are then grouped to reflect the various subnets or virtual networks.

The table may comprise additional columns, including a metadata column 154 that may contain additional information about the range of network addresses stored in the same row. For example, a range of network addresses may be associated with a common virtual network.

Storage of information by database management system 158 may also comprise maintenance of various index structures. An index may comprise entries representative of a virtual network identifier 150 and network address range 152. In some embodiments, an index may be constructed so as to consolidate network address ranges stored in a table to a smaller number of ranges stored in the index. In other embodiments, an index structure may be maintained on a one-to-one basis, so that each index entry corresponds to a particular row. A value, such as a virtual network identifier 150, may be employed, in various cases and embodiments, to allow for improved efficiency when performing operations applicable to a particular virtual network. An index may be structured based on various factors, such as geographic location, data center, virtualized network identifier and so on.

In various cases and embodiments, client 160 may issue various requests to perform validation operations or other actions involving the data, such as the validation operation 104 depicted in FIG. 1A. In some cases, requests may pertain to retrieving information associated with a particular IP address or range of addresses.

Performing these and other functions on network address data may involve traversals of applicable index structures and tables to locate the relevant data. Traversal of a table comprising network information may involve examination of data on a row-by-row basis. However, the traversal may be efficient due to storing network address information as ranges of addresses instead of as individual addresses. Traversal of an index may also be efficient due to representation of entries as ranges instead of as individual addresses. Note that in some cases, a range of network addresses may include only one network address. However, improved efficiency may result from subsequent consolidation of one-address network ranges into multiple-address ranges. This may occur within an index. Embodiments may allow an entry in an index to represent multiple rows through a network address range that encompasses the included rows.

The term index, as used herein, may apply to various data structures that may be employed to quickly locate a row within a table of data containing network address information. In some cases and embodiments, database index structures may be employed. In other cases and embodiments, a structure such as a range tree, segment tree or other binary or N-ary tree containing data representative of network address ranges may be employed.

Network address range information may be stored using a variety of data structures including, but not limited to, a bit field with bits set to correspond to output of a hash function, range trees, interval trees, binary trees and so on. In some cases, a bit field may be used so that the position of bits in the bit field directly corresponds to an address. The addresses may, for example, be stored in a separate list, so that each position in the bit field corresponds to a position in the list, and accordingly to a specific address. Various other techniques for mapping positions in a bit field to an address may be employed. The techniques described herein may be used by embodiments to store address range information within tables, indexes or other structures.

Figure 2A:
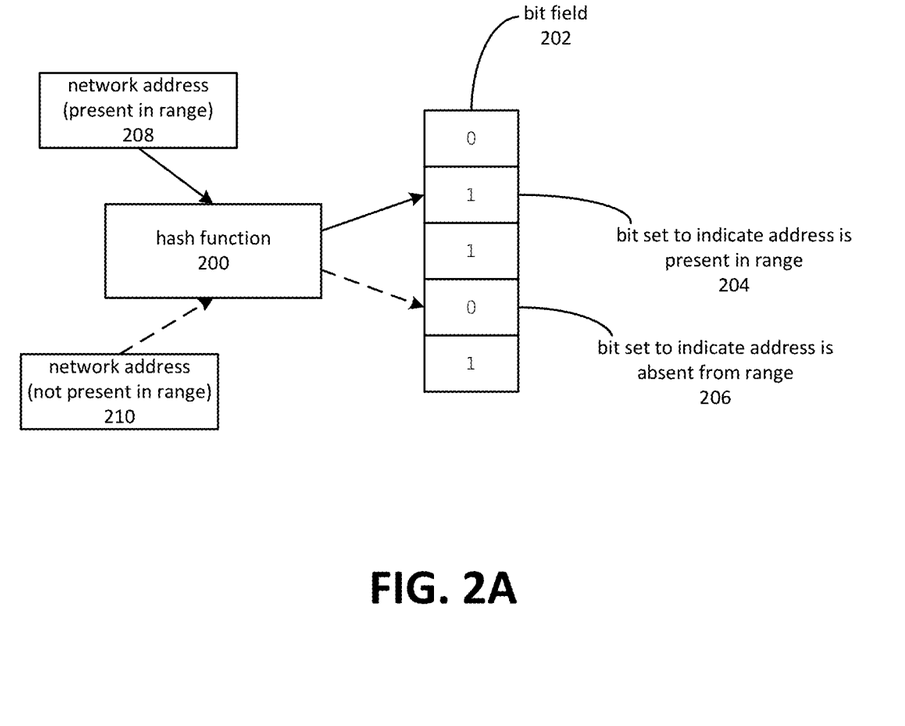
FIG. 2A is a block diagram depicting an example of a storage structure for a network address range data type using a bit-field indexed by a hash function.

FIG. 2A depicts one example of a storage technique for network address range information. Network address information may be applied to a hash function 200. A hash function 200 may, in some embodiments, be selected to be sufficiently granular to allow different network addresses supplied as input to the hash function to result in different outputs. Successive applications of hash function 200 may result in outputs that may be combined to form bit field 202. Each bit in bit field 202 may correspond to a possible output of hash function 200. A bit may be set to one in order to indicate that an address is present in a range of network addresses or be set to zero to indicate that an address is not present. For example, FIG. 2A depicts a first application of hash function 200 to a network address 208 to determine that it is present in an address range, as indicated by element 204. A second application of hash function 200 to a second address, network address 210, may indicate that the second address is not present in the range, as indicated by element 206.

Figure 2B:
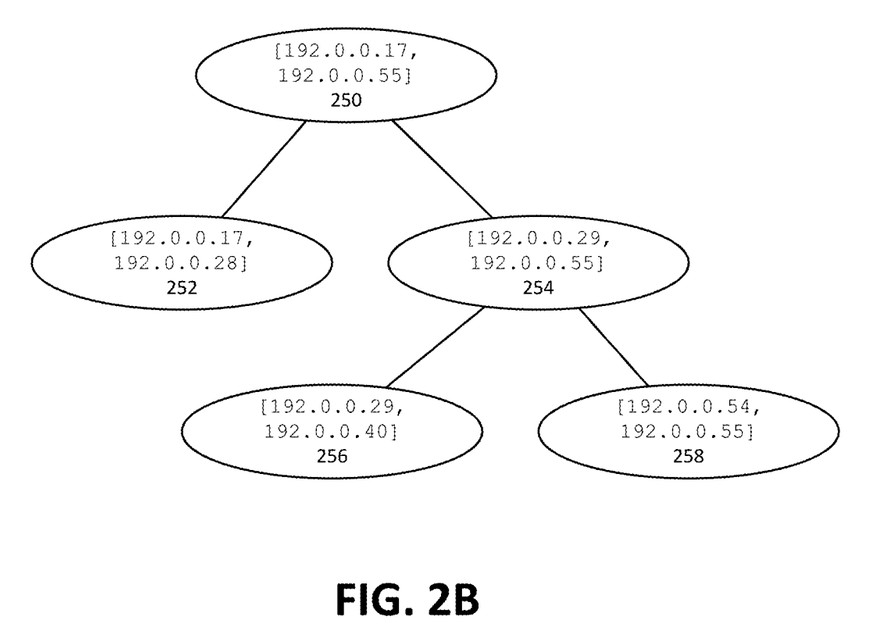
FIG. 2B is a block diagram depicting an example of a storage structure for a network address range data type using a range tree.

Embodiments may also employ range trees, interval trees or other such methods to store address range information. FIG. 2B depicts an example of one type of range tree that may be utilized by some embodiments to form a representation of network address ranges for storage. A range tree may comprise branch nodes, such as nodes 250 and 254, and leaf nodes, such as nodes 252, 256 and 258. A branch node may contain information indicating the range of network addresses represented by its child nodes. For example, node 250 has child nodes representing various addresses within the range of addresses from 192.0.0.17 to 192.0.0.55. Specific ranges may be represented by leaf nodes. For example, node 256 represents network addresses in the range 192.0.0.29 to 192.0.0.40. A range tree may be traversed to determine if a particular network address is represented by the range. Branch nodes may be used to guide the traversal. For example, in order to determine if the address 192.0.0.33 is represented by the tree, nodes 250 and 254 may be traversed in order to reach leaf node 256, from which it may be determined that the network address 192.0.0.33 is represented by the range. In various embodiments, branch nodes may contain information that may be used to increase the efficiency of the traversal, such as an indicator of what ranges are represented by the left and right branches of a node.

The example of a range tree depicted in FIG. 2B is intended to be illustrative and should not be viewed as limiting the scope of the present disclosure. Various similar or alternative structures may be employed. Embodiments may utilize structures adapted to various characteristics such as the sparseness of addresses within a range, whether or not address ranges may overlap, the total number of addresses to be stored, the frequency with which address range information will need to be updated and so on.

Figure 3:
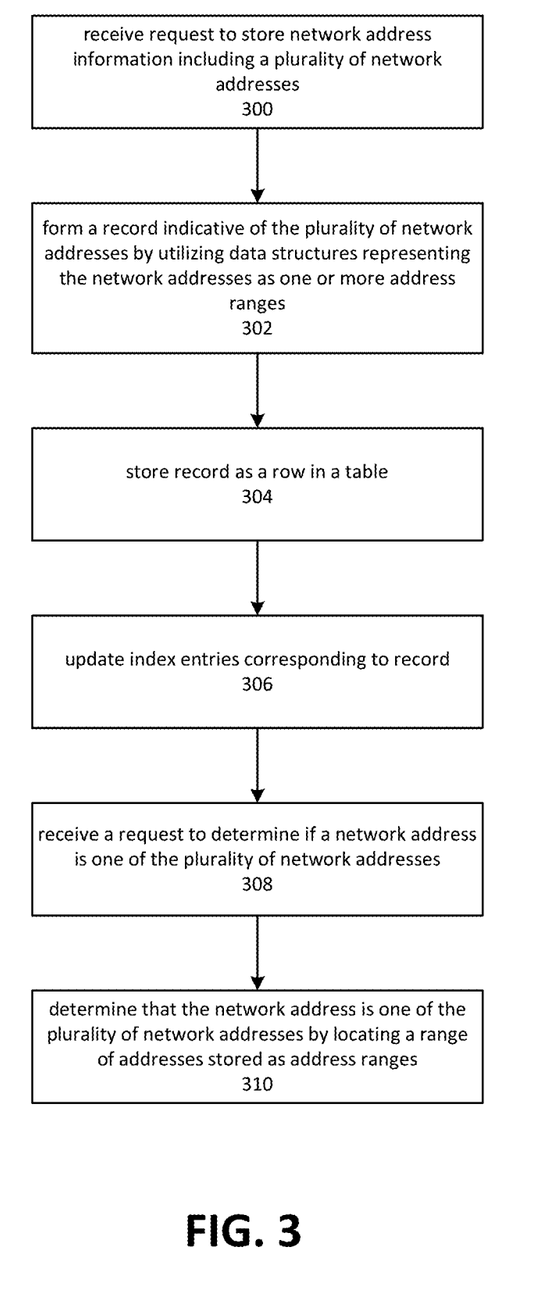
FIG. 3 is a flowchart depicting an example of a process for storing and retrieving network address information using a network address range data type.

FIG. 3 depicts an example of a process for storing and retrieving network address information. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 300 depicts receiving a request to store network address information. Network address information may include a plurality of network addresses, expressed individually or through notation indicative of a range. Network address information may be supplied in textual representations or using various data structures. Network address information may be accompanied by information indicating the applicable range or ranges to which the network addresses belong. For example, addresses within a range might be associated with a virtual network identifier.

In various cases and embodiments, network address information corresponding to a number of network addresses may be received as individual addresses, as sets of individual addresses, as ranges of addresses and so on. Network addresses pertaining to a particular range of network addresses may, in some cases and embodiments, be received at different times. Embodiments may adapt storage techniques, as described herein, based on expected arrival patterns of address range information.

As depicted by operation 302, embodiments may form a record indicative of a range of network addresses corresponding to the received network address information. In some cases and embodiments, an updated record may be formed from an existing record. This could occur, for example, when one or more additional network addresses are to be added to an existing range. In other cases, a record indicative of a range of network addresses may be newly formed. Some embodiments may attempt to merge the received network address information with existing records, in which case no new record is formed. Instead, an existing record might be updated to reflect the inclusion of a particular address within a range represented by the existing record. It might also be the case that the address is already represented by an existing record, which in some cases may indicate that no record is to be formed or modified.

A record for storing network address range information may comprise a data structure containing a representation of a range of network addresses. The record may also comprise additional information, such as metadata describing various aspects of the range of addresses, one or more bitmasks applicable to the range, a virtual network identifier and so forth.

Operation 304 depicts storing the record on a storage device. In various embodiments, a database management system may store an address range as a data type integrated into a database management system as a native type, or in other words as a data type known to the database management system. Each instance of the data type, which may be referred to as a network address range data type, may be stored in a file or other structure maintained on a storage device and containing a collection of related data, such as the rows of a table, a collection of key-value pairs and so on. A schema may be defined that identifies a column of a table as being a network address range data type. An instance of the data type may contain both the data structure representing an address range and additional metadata. In some embodiments, column metadata may be used to store information applicable to instances of the network address range data type within a particular column.

Operation 306 depicts updating or adding index entries corresponding to the record. A database management system may maintain an index over a column comprising the network address data type in its schema definition. In various embodiments, the index may be adapted for use with a network address data type. For example, embodiments may employ a range tree structure to index ranges of network addresses corresponding to sub-ranges stored within rows of a table containing a network address data type.

Various operations may be performed on network address range information maintained by a database management system using various techniques presented herein. Operation 308 depicts processing a request to determine if a network address is one of a plurality of network addresses. In some cases, the address may be part of a list of network addresses that are to be verified against ranges of network addresses maintained by a database management system. An example of this category of request is depicted by FIG. 1A. As used herein, the term "validate" may refer to determining whether or not an address is among a set of stored addresses ranges.

In response to the request, embodiments may attempt to validate an address by determining that the address is among a plurality of addresses stored as address ranges by a database management system. This is depicted by operation 310. Embodiments may perform this operation utilizing a variety of techniques, which may comprise retrieval of rows containing network address information. Each row may contain a value representing a range of network addresses. A search for the address to be validated may be performed within the range of addresses represented by the value stored in that row. In some cases and embodiments, the value may be a bit field corresponding to a hash function. In this case, a search for the address to be validated may be performed by applying a hash function to the address and determining if a bit corresponding to the address is set within the column value. In other cases, the value may be a range tree. In such cases, the tree may be searched for the address to be validated.

Figure 4:
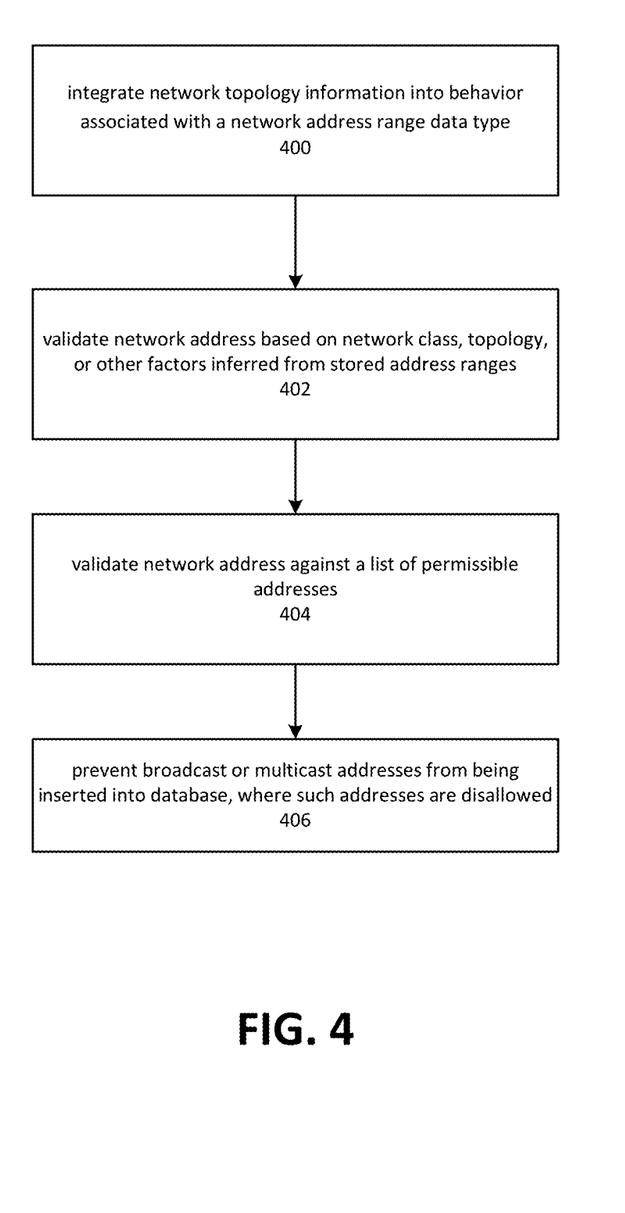
FIG. 4 is a flowchart depicting validation, data consistency and security operations that may be performed using a database management system storing network address range information.

FIG. 4 depicts validation, data consistency and security operations that may be performed by some embodiments using various techniques described herein. Although depicted as a sequence of operations, those of ordinary skill in the art will appreciate that the depicted order should not be construed as limiting the scope of the present disclosure and that at least some of the depicted operations may be altered, omitted, reordered or performed in parallel. Moreover, the depicted operations are examples of various operations that may be performed individually or in combination in connection with maintaining a database of network address information.

Operation 400 depicts integrating network topology information into behavior associated with a network address range data type. The behavior of an instance of a network address range value may be based at least partially on the network topology with which an address range is associated. For example, a network address range may be associated with a virtual network identifier. Data indicative of the virtual network identifier may be stored with other data representing an address range. A virtual network associated with the identifier may be associated with various constraints involving the topology of the virtual network, such as allowed classes of addresses, whether or not broadcast addresses are allowed, a maximum number of addresses, reserved addresses and so forth. Some embodiments may store topology information in a database and use the information to influence behavior of a network address range data type. Embodiments may also influence behavior of a network address range data type through various constraints, triggers and so forth established based at least in part on topology of an associated network.

Operation 402 depicts validating a network address based on network class, network topology, or other factors that may be inferred from stored address ranges. A network class may include address classes such as the "A," "B" and "C" address classes. A network address may be validated by determining if the address is a valid member of a class. Validation may also comprise determining if the address is in a range of addresses permitted by a network topology associated with the address. For example, a range of addresses may be associated with a subnet, and an address is to be compared to determine if the address would be a member of that subnet. Embodiments may take various actions in response to determining that an inconsistent address has been inserted into the database. These include preventing the address from being stored, marking the address as being suspect and so forth.

Operation 404 depicts validating a network address against a list of permissible network addresses. A list of permissible network addresses may be stored in a database as an instance of a network address range data type. The address to be validated may be located within the range of network addresses to determine if it is valid. Some embodiments may employ a blacklist-based approach instead of a whitelist-based approach. These embodiments may store a list of invalid, or in other words blacklisted, addresses that may not be inserted. The list of addresses may be stored using an instance of a network address range data type.

Operation 406 depicts preventing broadcast or multicast addresses from being stored in a database of network addresses, where such addresses are disallowed. A multicast address may represent a group of addresses to which broadcast messages may be disseminated. A broadcast address is an address that may be used to send messages to each host on a network. The use of broadcast and multicast messages may sometimes be a security concern. In response to these concerns, embodiments may prevent insertion of broadcast and multicast addresses into a database. Detection of multicast addresses may be based on an examination of addresses within a range of addresses, in which addresses conforming to multicast address designations are identified. A similar approach may be employed in connection with broadcast addresses. Similar operations may be performed in relation to other address classes, such as unicast, manycast or anycast address classes. These types of addresses may be referred to as one-to-many addresses.

The operations depicted in FIG. 4 may, in various embodiments, be practiced in connection with a built-in data type representing network address ranges. Various aspects of the operations may be embodied in computer-executable instructions operating on data associated with an instance of an address range data type. These instructions may be organized as class methods, stored procedures, constraints, triggers and so on. Embodiments may operate on and refer to data stored within an instance of an address range data type, as well as to other sources of data, such as column metadata, external tables, external databases and so forth.

Figure 5:
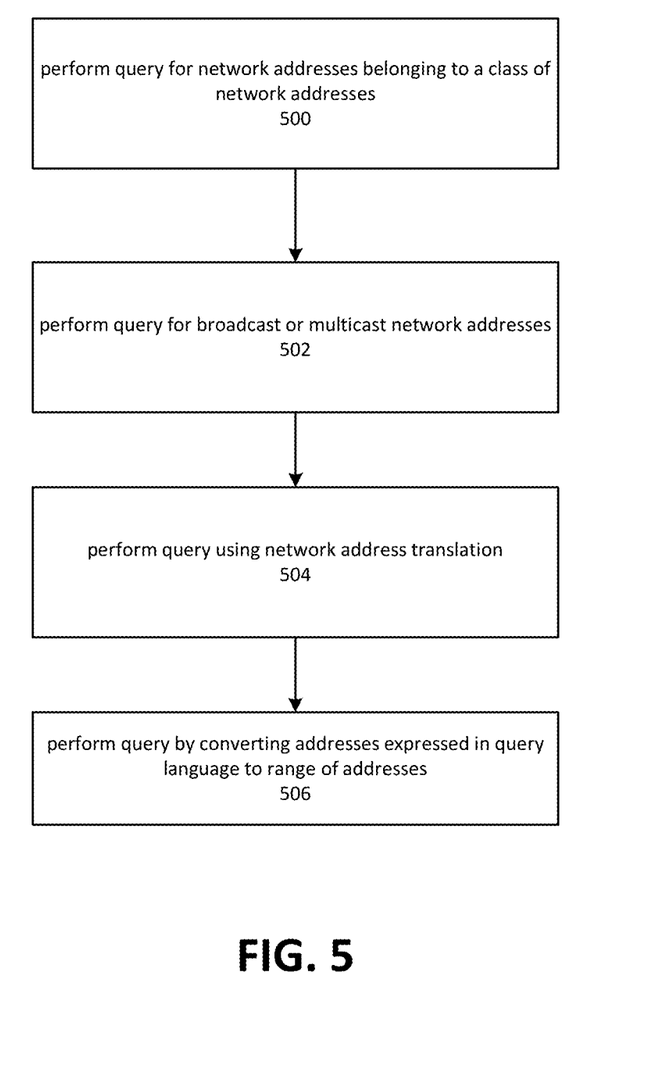
FIG. 5 is a flowchart depicting examples of queries that may be performed on a database table having stored network address range information.

FIG. 5 depicts performing a variety of queries involving network address ranges stored in a database management system. Although depicted as a sequence of operations, those of ordinary skill in the art will appreciate that the depicted order should not be construed as limiting the scope of the present disclosure and that at least some of the depicted operations may be altered, omitted, reordered or performed in parallel. Moreover, the depicted operations are examples of various operations that may be performed individually or in combination in connection with maintaining a database of network address information.

Various operations, such as those depicted in FIG. 5, may be performed based on a query language statement supplied by a client to a database management system. Within a query, individual network addresses and ranges of network addresses may be expressed as native language elements. In some cases, network addresses and ranges of network addresses may be expressed as string literals, i.e. surrounded by double quotes or other delimiters. In various embodiments, functions and methods for performing network-related functions may be included in a query. For example, conversion functions or conversion operators may support network address translation, validity checks and so forth.

Operation 500 depicts performing a query for stored network addresses that belong to a class of network addresses. A class of network addresses may include IP address classes, such as "A," "B" or "C." Performing a query may include network class as a criterion for performing a search of stored network address ranges. Embodiments may search stored network address range data to determine which addresses in the stored ranges belong to the indicated class.

Operation 502 depicts performing a query for broadcast or multicast network addresses stored in a database management system. Stored network address ranges may be searched to determine if one or more of the addresses stored within the ranges may be classified as broadcast or multicast addresses. This may involve a traversal of stored network address ranges and a search through each individual network address range. Embodiments may associate metadata with a stored network address range to indicate various characteristics of the corresponding range of addresses, such as whether or not the range contains a broadcast or multicast address. Similar approaches may be employed regarding network class.

Operation 504 depicts performing a query using network address translation. As used herein, the term address translation may involve various forms of translating one form of an address to another. This may include network address translation performed to convert network addresses uses in private networks to a corresponding address for use on a public network. It may also involve translating from an IP version 6 address to an IP version 4 address and other similar operations.

Operation 506 depicts performing a query based at least in part on converting addresses expressed in a query language to a range of addresses, such as those that may be expressed as a network address range data type. Lists of individual addresses may be expressed using a textual representation in a query language. In various embodiments, network addresses may be an integrated element of a query language, which may allow for IP addresses to be expressed without delimiters, such as quotation marks. In some cases and embodiments, notation may be developed to express individual addresses, lists of addresses and/or ranges of network addresses in a query language.

Embodiments may maintain a repository of network topology information. The network topology information may be employed in conjunction with validating addresses and address ranges to be added to a database. The topology information may comprise information such as ranges of addresses that may be inserted, ranges of addresses that may not be inserted, ranges of addresses that are locked and so forth. A locked range may be considered frozen, so that addresses may be neither added nor removed from the range until it is unlocked. Various operations may be performed by validating addresses or address ranges based at least in part on the network topology information stored in the repository. Examples of such operations include, but are not limited to, inserting new addresses into a table of addresses, deleting an address from a table of addresses, determining interconnections between subnets or virtual networks and so on. The term repository, as used herein, may refer to a database, file or other means of storing and retrieving information from a storage device.

Embodiments may convert individual network addresses, lists of addresses and/or ranges of network addresses as expressed in a query language to a range of addresses using a selected data structure. The data structure may be selected based on a variety of factors. In general terms, these factors may be described as configuration-based factors and automatically applied factors. Examples of configuration-based factors include settings associated with the definition of a column that is defined to hold network address range information. Examples of automatically applied factors include the number of addresses to be stored within the range, density of addresses within the range, uniformity of density, expected growth rate and so forth. A bit field indexed by a hash function might, for example, be selected to represent a dense but non-uniform population of addresses within a range. In some cases, a range tree structure might be used when the number of addresses to be stored is large, as might be the case when representing addresses contained within a large subnet.

In some embodiments, network address range data supplied as criteria in a query may be converted to a format selected based on search efficiency. For example, if an address range is to be used as a criterion in a search of address range data stored as bit fields, it may be efficient to also convert the criterion to a bit field indexed by the same hash function. A binary "AND" operation on the two bit fields may then be used to determine which address ranges specified in the criterion are present in a stored network address range.

In some cases and embodiments, results of the query may be expressed as individual network addresses or as ranges of network addresses. Data corresponding to a network address range data type may be transmitted from a database management system to a client. Computer-executable code operating on the client may act upon the transmitted data to perform various operations described in the present disclosure, such as searching an address range as represented by an instance of an address range data type. A query language or call level interface may be extended to provide control over the format in which network address range information is provided. Embodiments may, for example, extend structured query language ("SQL") constructs to provide for control over storage formats, to allow for conversion between textual representations of addresses and address ranges, to perform merging operations on address ranges and so forth.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as SQL, while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
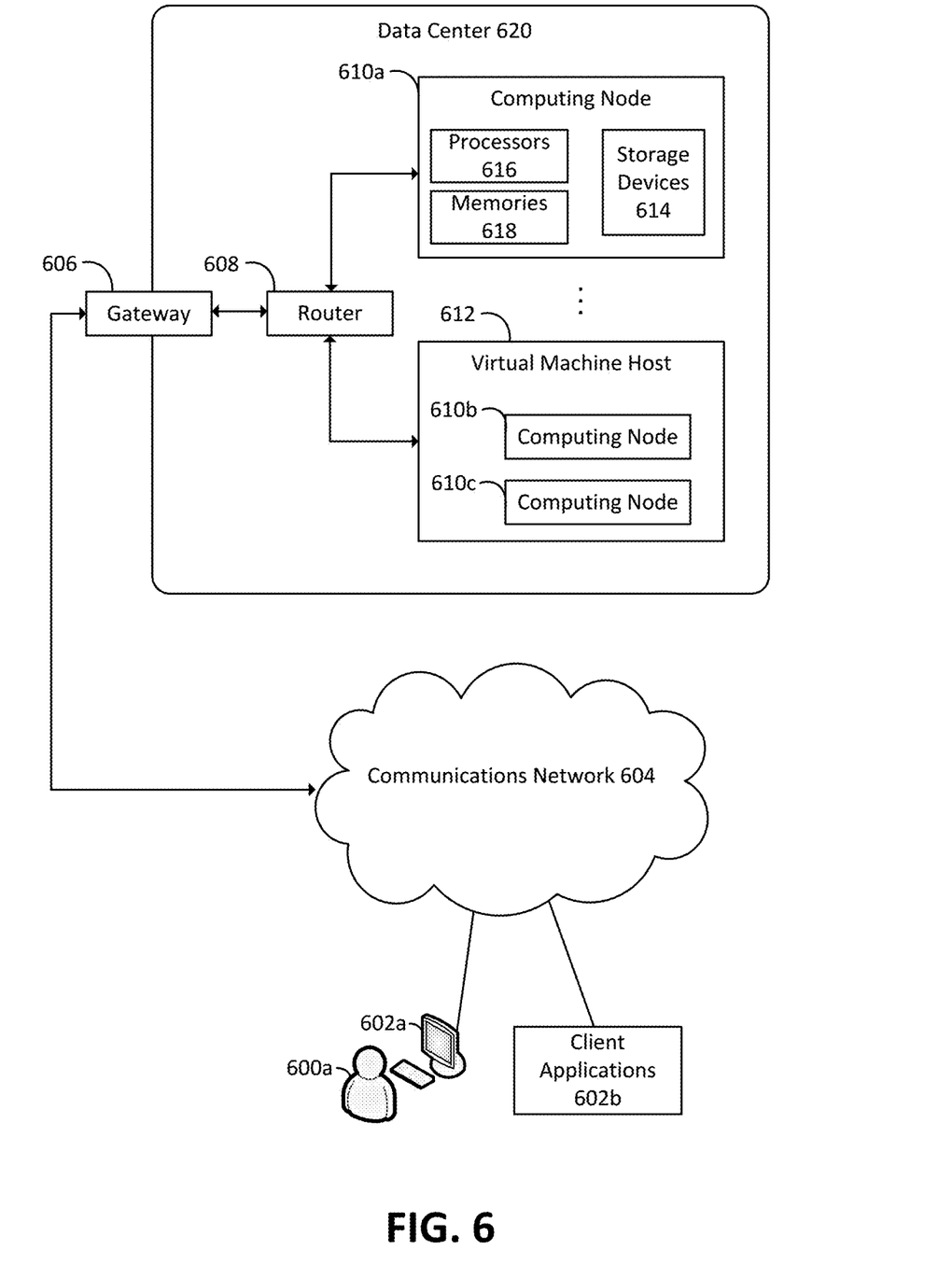
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b and 610c within a data center 620. Alternatively, client applications 602b may communicate without user intervention. Communications network 604 may comprise any combination of communications technology, including the Internet, wired and wireless local area networks, fiber optic networks, satellite communications and so forth. Any number of networking protocols may be employed.

Communication with processes executing on the computing nodes 610a, 610b and 610c, operating within data center 620, may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b and 610c. Some of these intermediate layers may themselves comprise processes executing on one or more of the computing nodes. Computing nodes 610a, 610b and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614. Processes on computing node 610a may execute in conjunction with an operating system or alternatively may execute as a bare-metal process that directly interacts with physical resources, such as processors 616, memories 618 or storage devices 614.

Computing nodes 610b and 610c are depicted as operating on virtual machine host 612, which may provide shared access to various physical resources such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tables, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
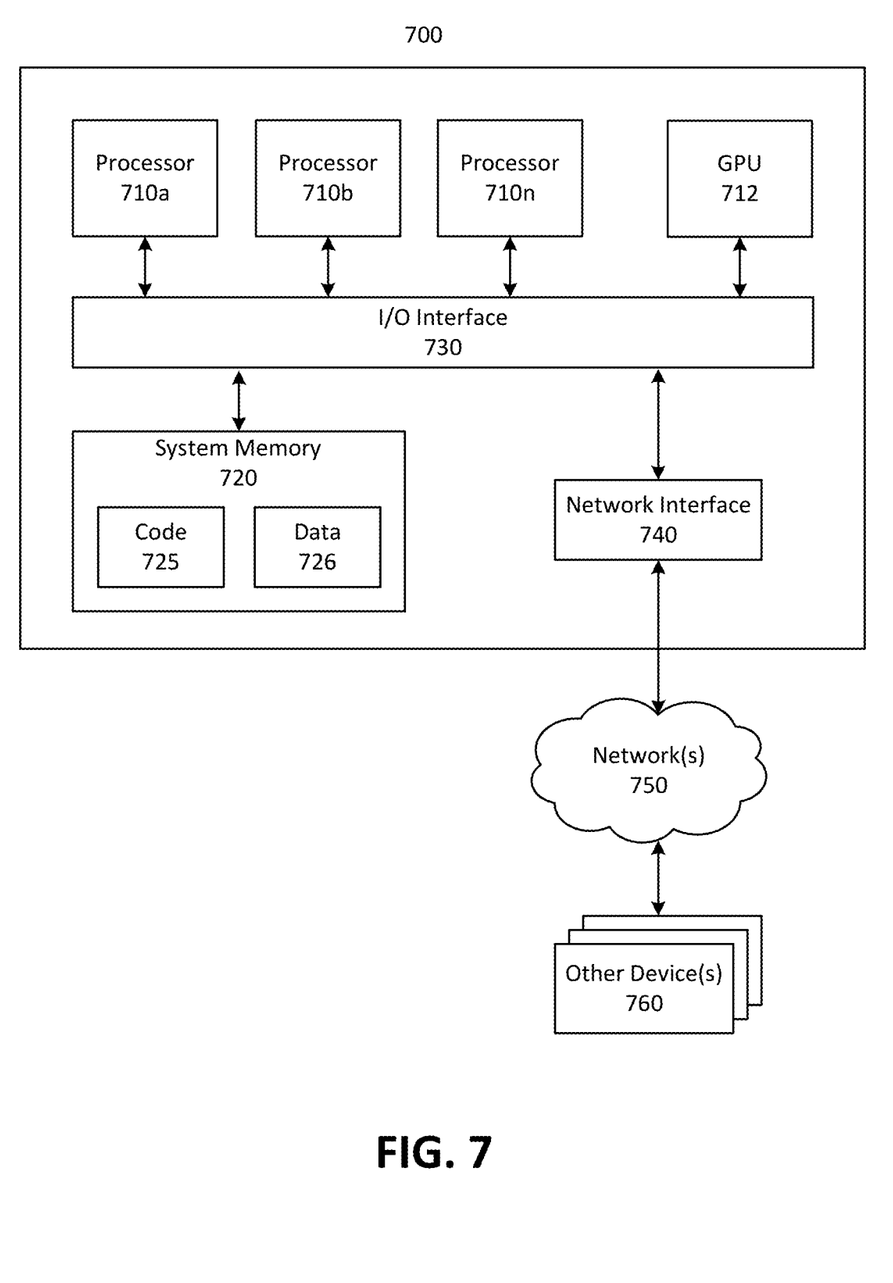
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device. A GPU may also be configured to execute instructions that, when executed, practice aspects of the present disclosure.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more computing nodes configured as a database maintaining a plurality of records stored on one or more storage devices; and
   one or more memories having stored thereon computer readable instructions that, upon execution by a computing device, cause the system at least to:
      receive a first query language command comprising a representation of a plurality of network addresses, the first query language command indicative of a request to store in the database the plurality of network addresses, wherein each of the plurality of network addresses is associated with at least one of a plurality of virtual networks;
      form, in response to receiving the first query language command, a record indicative of a first one or more ranges of network addresses and indicative of an association of the at least one of the plurality of virtual networks with the first one or more ranges of the network addresses, the first one or more ranges representative of the plurality of network addresses;
      store the record in the plurality of records;
      receive a second query language command comprising a second request to determine that a first network address is one of the plurality of network addresses;
      determine that the first network address is one of the plurality of network addresses based at least in part on locating the record stored in the plurality of records and at least in part on determining that the first network address is represented by the one or more ranges of network addresses; and
      store at least one entry in an index, the at least one entry comprising information indicative of a second one or more ranges of network addresses, the second one or more ranges of network addresses encompassing the first one or more ranges of network addresses.

2. A method comprising:
   receiving a request to store a plurality of network addresses, the request comprising a representation of the plurality of network addresses, wherein each of the plurality of network addresses is associated with at least one of a plurality of virtual networks;
   storing a record on one or more storage devices, the record comprising data indicative of a first one or more ranges of network addresses corresponding to the plurality of network addresses and indicative of an association of the at least one of the plurality of virtual networks with the first one or more ranges of the network addresses;
   receiving a request to determine that a first network address is one of the plurality of network addresses;
   determining that the first network address is one of the plurality of network addresses based at least in part on locating the record on the one or more storage devices and at least in part on determining that the first network address is in the one or more ranges of network addresses; and
   forming an index comprising at least one entry, the at least one entry comprising information indicative of a second one or more ranges of network addresses, the second one or more ranges of network addresses including the first one or more ranges of network addresses.

3. A non-transitory computer-readable medium having stored thereon instructions that, upon execution by the one or more computing devices, cause the one or more computing devices to at least:
receive a request to store a plurality of network addresses, the request comprising a representation of the plurality of network addresses, wherein each of the plurality of network addresses is associated with at least one of a plurality of virtual networks;
store, on one or more storage devices, a record comprising data indicative of a first one or more ranges of network addresses corresponding to the plurality of network addresses and indicative of an association of the at least one of the plurality of virtual networks with the first one or more ranges of the network addresses;
receive a request to determine that a first network address is one of the plurality of network addresses;
determine that the first network address is one of the plurality of network addresses based at least in part on locating the record on the one or more storage devices and at least in part on determining that the first network address is in the one or more ranges of network addresses; and
form an index comprising at least one entry, the at least one entry comprising information indicative of a second one or more ranges of network addresses, the second one or more ranges of network addresses including the first one or more ranges of network addresses.

4. The non-transitory computer-readable medium of claim 3, wherein the at least one entry comprises information indicative of a virtual network identifier.

5. The system of claim 1, further comprising one or more memories having stored thereon computer readable instructions that, upon execution by a computing device, cause the system at least to:
determine that the first network address is a valid member of a virtual network based at least in part on the determination that the first network address is one of the plurality of network addresses.

6. The system of claim 1, further comprising one or more memories having stored thereon computer readable instructions that, upon execution by a computing device, cause the system at least to:
store the record indicative of the first one or more ranges of network addresses in a format selected from a group consisting of a bit field mapped to a plurality of addresses, a hash-indexed bit field, and a range tree.

7. The system of claim 1, wherein the record comprises a bit field mapped to a plurality of addresses, a bit field indexed by a hash table, or a range tree.

8. The method of claim 2, further comprising:
determining that the second network address of the plurality of network addresses is a one-to-many address.

9. The method of claim 2, further comprising:
validating the first network address based at least in part on the determination that the first network address is part of the plurality of network addresses.

10. The method of claim 2, further comprising:
determining that the first network address is a valid member of a virtual network based at least in part on the determination that the first network address is one of the plurality of network addresses.

11. The method of claim 2, further comprising:
maintaining a repository of network topology information, the network topology information comprising at least one of a first range of addresses that may be inserted, a second range of addresses that may not be inserted, or a third range of addresses that is locked; and
processing the request to determine that the first network address is one of the plurality of network addresses based at least in part on the network topology information.

12. The method of claim 2, wherein the record comprises a bit field mapped to a plurality of addresses, a bit field indexed by a hash table, or a range tree.

13. The method of claim 2, wherein the request to store the plurality of network addresses is a query language command containing a textual representation of a range of network addresses, the method further comprising:
forming the record based at least in part on parsing the query language command.

14. The method of claim 2, wherein the at least one entry comprises information indicative of a virtual network identifier.

15. The method of claim 2, further comprising:
determining that the first network address is at least one of a unicast address, a broadcast address, a multicast address, an anycast address, or a manycast address.

16. The method of claim 2, further comprising:
determining a network class of the first network address.

* * * * *